SIGNAL RECOGNITION DEVICE

Filed May 4, 1964

3 Sheets-Sheet 1

INVENTORS
WILLIAM H. FUHR,
DAVID F. GUINN
& PETER H. HALPERN
BY Hurvitz & Rose
ATTORNEYS INVENTORS
WILLIAM H. FUHR,
DAVID F. GUINN
& PETER H. HALPERN
BY Hurvitz & Rose
ATTORNEYS INVENTORS
WILLIAM H. FUHR,
DAVID F. GUINN
& PETER H. HALPERN
BY Hurvitz & Rose
ATTORNEYS United States Patent Office 3,319,229

Patented May 9, 1967

3,319,229

SIGNAL RECOGNITION DEVICE

William H. Fuhr, Springfield, and David F. Guinn, Fairfax, Va., and Peter H. Halpern, Sarasota, Fla., assignors to Melpar, Inc., Falls Church, Va., a corporation of Delaware Filed May 4, 1964, Ser. No. 364,665

15 Claims. (Cl. 340—172.5)

The present invention relates generally to signal recognition and analyzing systems and more particular to a system wherein a binary descriptor, derived for each signal analyzed, is compared on a Hamming distance basis with stored binary descriptors of signals previously analyzed by the system.

The importance of signal separation and classification in the search, selection, and retrieval of information has long been recognized. In order to facilitate such separation and classification, it is desirable, in some instances, to assign numbers or numerical descriptors to bandwidth-limited wave-forms which exist over some finite interval. If the assignment operation is such that each individual waveform is assigned a different number, then it is possible to deal with these "numerical descriptors" in place of the signals themselves. If every input is assigned a number, whereby each number thus assigned represents an entire class of inputs, the result obtained is the "classification" of the inputs. It is then possible to deal with the numerical descriptors in place of the input classes represented. The effectiveness of such an operation depends upon its being based on some measurable property of the input waveforms in the sense that a given input is always mapped into the same descriptors. This implies that experiments can be performed with the inputs whereby the numerical descriptors are assigned.

According to the present invention, binary descriptors are derived by a series of filters, each of which is responsive to the signal being scanned or analyzed. For each signal scan, the output of each filter must have a 0.5 probability of exceeding a threshold value so there are equal chances of deriving binary ones and zeros from it. A further requirement of the filters is that the output of each be independent of the others, that is, the output of any one filter has 0.5 probability of being a binary one, without regard to the outputs of the others.

A filter having these characteristics is attained by multiplying the detected signal $f(t)$ with a wave $g(t)$ having amplitudes of $+1$ and $-1$ and a frequency harmonically related to the period of each scanning cycle. The resultant product is integrated over the scanning cycle length, T. If the integrated value of $f(t)$ when $g(t)=1$, $$\int_0^T f(t)[g=(1)]dt$$

exceeds the integrated value of $f(t)$ when $g(t)=-1$, $$\int_0^T f(t)[g=(-1)dt$$

a binary one is derived from the filter, while a binary zero is derived if the converse occurs. Since $g=(1)$ and $g=(-1)$ occurs for the same interval over T, there is a 0.5 probability that $$\int_0^T f(t)[g=(-1)]dt$$

will exceed $$\int_0^T f(t)[g=(1)]dt$$

and vice versa. To satisfy the requirement concerning independent filter responses the square wave input to each filter may be harmonically related.

The signals deriving from the separate property filters are supplied to a memory that may comprise a manually activated switch network or a magnetic core transfluxor matrix. When the signals to be ultimately analyzed are first derived, the memory is set so that a one to one correspondence exists therein for the bits deriving from the separate property filters. For each separate signal analyzed, a different set of bits is stored in the memory.

After signal storage has been completed, the system is considered as having "learned" the binary descriptors for the several signals and is prepared to analyze future signals. The system is capable of determinging, on a probability basis, the similarity between the stored and analyzed signals. If there is not exact agreement between the stored and analyzed signals, a determination can be made on a similarity basis or an indication that the analyzed signal is very different from all the stored signals can be made.

In comparing the analyzed and stored signals, the memory derives a signal directly proportional to the agreement of each stored descriptor and the descriptor derived in response to the analyzed signal. If there is complete agreement between the descriptors of any stored signal and the analyzed signal, an indicator of maximum value is generated by the memory for that stored signal. As the degrees of match between the descriptors of the stored and analyzed signals decrease, the amplitudes of the indicators for the particular stored signals likewise decrease. Thus, the indicator amplitudes are a function of the Hamming distance between the analyzed and stored signals. Hamming distance between the two binary words is defined as the sum of the number of binary bit dissimilarities for identical bit positions of the two words.

The Hamming distance indicators are compared against each other. The one of greatest amplitude generally activates an indicator to provide information regarding the signal analyzed. If none of the amplitudes exceeds a predetermined amplitude, an indication is provided that the system did not "learn" the analyzed signal.

It is, accordingly, an object of the present invention to provide a new and improved signal recognition system capable of identifying similar, but not invariant, signals.

Another object is to provide a signal recognition system employing binary signal descriptors that have equal probabilities of assuming the two binary states.

A further object of the invention is to provide a new and improved signal recognition system employing plural binary descriptors for each signal, which descriptors are derived independently of each other.

An additional object of the invention is to provide a signal recognition system employing plural binary descriptors for each signal, which descriptors have equal probabilities of assuming the two binary states and are derived independently of each other.

Yet another object is to provide a signal recognition system wherein the Hamming distances between descriptors of stored and analyzed signals are utilized to provide an indication of the stored signal most similar to the analyzed signal.

Still a further object of the present invention is to provide a new and improved filter circuit having equal probabilities of generating outputs above and below a reference.

An additional object of the invention is to provide a circuit for deriving information concerning the Hamming distance between an input signal and a set of stored signals.

Still a further object is to provide a new and improved magnetic core matrix for deriving Hamming distance indications between an input signal and a set of signals stored by the matrix.

Yet another object of the invention is to provide a new and improved system for recognizing and "learning" signals having differing characteristics but which provide information concerning the same class of data, e.g. a system that can "learn" and recognize a number of print fonts for the same letter.

The above and still further objects, features and advantages of the present invention will become apparent upon consideration of the following detailed description of one specific embodiment thereof, especially when taken in conjunction with the accompanying drawings, wherein.

Figures 1, 2:
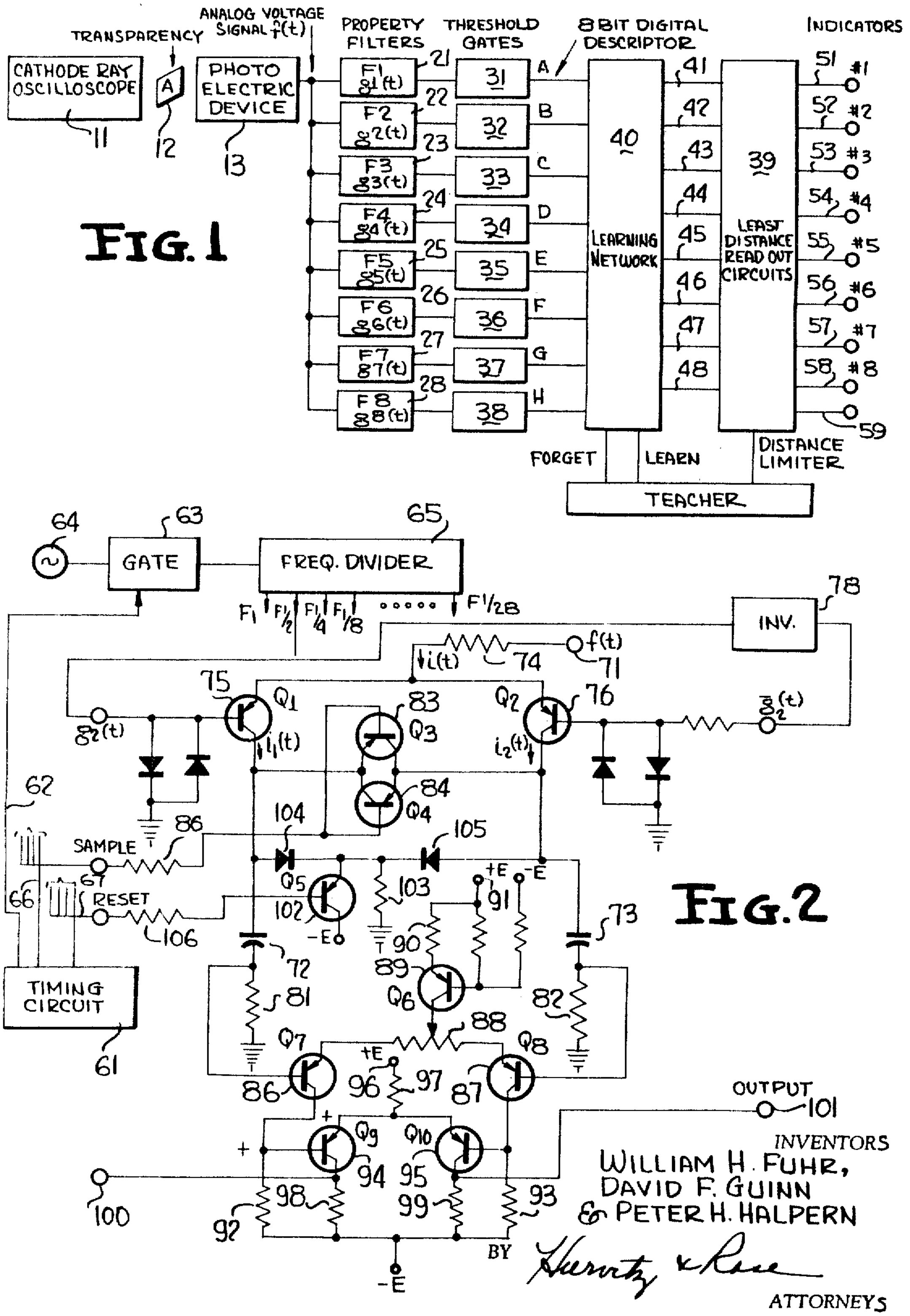
FIGURE 1 is a system block diagram of an exemplary embodiment of the invention.
FIGURE 2 is a circuit diagram of a property filter and threshold gate used in FIGURE 1.

Reference is now made to FIGURE 1 of the drawings, a block diagram of a simplified system for recognizing eight different letters of one print font. The letter being analyzed is an opaque coating on transparency 12 that is scanned by light deriving from flying spot scanner cathode ray oscilloscope 11. To detect the light pulses that occur in response to light interception by the coating, photoelectric pickup 13 is provided.

The pulses detected by pickup 13 are applied in parallel to eight property filters 21–28, each of which has a different, independent response. The filters are constructed such that the output of the $p^{th}$ filter at the end of the scanning interval is $$\int_0^T g_p(t)f(t)dt \ldots \quad (1)$$

where;

$p=1, 2 \ldots 8$; $g_p(t)$=the response of the $p^{th}$ filter;
$f(t)$ represents the input to the filters in the scanning interval; and
$T$=length of the scan.

At the end of the scanning interval, the amplitude deriving from each of filters 21–28 is sampled by threshold gates 31–38, respectively. If the signal amplitude deriving from a particular filter is greater than a predetermined amplitude, the respective threshold gate generates a binary one output while signal amplitudes less than that amplitude result in the derivation of a binary zero by the threshold gate.

The binary signals deriving from gates 31–38 are applied to learning network 40. During the machine learning state, a human operator inserts transparency 12 having a certain letter thereon, e.g. A, between oscilloscope 11 and pickup 13. After the transparency has been scanned, binary outputs are derived from gates 31–38. The operator activates the "learn" input for network 40 so that the eight binary bits are stored in the network at a predetermined location having the address "A." The letter "B" is then scanned by CRT 11, causing a different set of binary outputs to be derived from gates 31–38. These binary inputs are stored at a different address in network 40, indicative of the letter "B." In a similar manner, the other six letters to be learned are stored in network 40.

If it is desired to store a different signal in a particular address of network 40, the "forget" input is activated and the contents of that address are erased. The signal for the new letter or font is then inserted after transparency 12 has been suitably scanned.

For each letter to be learned, a separate output of network 40 is provided. These outputs are coupled through "least distance readout circuit," 42, the purpose and construction of which is described infra, to the eight indicator lamps, 51–58. Lamps 51–58 are provided on a one by one basis for each of the letters to be learned and later analyzed.

Once the learning network 40 has stored the binary signals or descriptors for each letter to be analyzed, the system is ready to initiate the recognition process of letters identical to or somewhat different to those initially stored into the network. In response to scanning of each letter to be analyzed, each of gates 31–38 derives a binary bit in identically the same manner as was done during the learning process. The set of bits, i.e. word, deriving from gates 31–38 for each letter scanned is compared with the set of bits stored at each address in network 40. In response to this comparison, each address of network 40 derived on leads 41–48 a separate signal indicative of the difference between its stored set of bits and the set of bits applied thereto.

The comparison in network 40 between the stored and applied set of bits is made on the basis of logical distance, in the Hamming sense, between the two sets. The logical distance between two sets of binary bits is defined as the sum of the number of binary ones in the term by term exclusive or combination of the two words. Thus, the logical distance between 0000 and 0010 is 1, whereas the distance between 0110 and 1101 is 3. These are written as 0000*0010=1 and 0110*1101=3, respectively.

Consider the situation when learning network 40 stores in the addresses associated with leads 41 and 42 the binary words 10001001 and 00110111 for the letters A and B, respectively, and gates 31–38 apply the binary word 10001101 to network 40 after an analyzed letter has been scanned. In response to this set of conditions, the signal on lead 41 is a function of 10001001*10001101=1 while the signal on lead 41 is a function of 00110111*10001101=5.

The error indicating signals on leads 41–48 are compared in least distance read out circuit 39 that causes activation of the lamp coupled to the lead having the lowest error signal thereon. In the examples given above, lamp 51 is activated because the least distance indicator for "A" is less than for "B."

If there was substantial disagreement between the word applied to network 40 and each of the words stored therein, it is probable that the letter scanned was not the same as one of those originally learned or that the system is malfunctioning. In such case, an indication should be provided that the letter or stimulus being analyzed is not recognizable. According to the present invention, this result is accomplished by having the operator set into circuit 39 a signal indicative of the maximum tolerable error. If the error indicating function on each of leads 41–48 exceeds the maximum tolerable error set into circuit 39, none of lamps 51–58 is activated. Instead, "excessive distance" lamp 59 is energized to provide the desired result.

Consideration will now be given to the circuits employed for property filters 21–28, learning network 40 and least distance circuit 39.

Regarding the property filters, it is noted that the result expressed by Equation 1 may be achieved by multiplying the signal detected by pickup 13, $f(t)$, with a predetermined waveform and integrating the resultant over a scanning period of transparency 12. The predetermined waveform applied to each of the several filters must be different from each other to satisfy the condition that each filter have a separate response. This requirement is easily satisfied by applying square waves of harmonic frequency relations to the filters, i.e. square waves of frequencies $$F_1, \frac{F_1}{2}, \frac{F_1}{4} \ldots \frac{F_1}{129}$$

are applied to filters 21, 22, 23, . . . 28 respectively. To satisfy the requirement that each filter produce an output having equal probabilities of exceeding and being below a threshold, $$F_1=\frac{128}{kT}$$

where $k$ is any positive integer.

A typical property filter and threshold gate, as well as the circuitry for controlling same, are shown by FIGURE 2. The control network includes a timing circuit 61 that produces a gating voltage on lead 62 for the duration of the period transparency 12 is being scanned by CRT 11. The gating voltage on lead 62 opens gate 63 to pass the square waves deriving from oscillator 64 to frequency divider 65. Divider 65 is a chain of eight bistable counting devices from which are derived square waves of frequencies $$F_1, \frac{F_1}{2}, \ldots \frac{F_1}{128}$$

When the scanning interval has terminated, the gating voltage on lead 62 is removed, closing gate 63 and terminating the action of divider 65. The period of the lowest frequency wave deriving from divider 65, $F_1/128$, equals the scanning period, T, or $F_1/128$ is an exact multiple of T.

In FIGURE 2, the $F_1/2$ wave is applied to the filter illustrated, filter 22. Each other output of divider 65 is respectively applied to one of the other filters 21, 23–28.

After the scanning period has terminated, circuit 61 applies a sample pulse to each of property filters 21–28 via leads 66. This pulse samples the computation made during the scanning period. Once sampling has terminated and immediately prior to the beginning of a new scanning period, a reset pulse is applied to each of filters 21–28 via leads 67. In consequence each of the filters is always returned to the same initial condition when a new scanning cycle is initiated.

Property filter 22, as illustrated by FIGURE 2, is responsive to the signal detected by pickup 13, $f(t)$. When gate 63 is enabled, the $F_1/2$ output of divider 65 causes $f(t)$ to be selectively applied from terminal 71 to a pair of storage capacitors 72 and 73 via current controlling resistor 74 and the emitter-collector paths of PNP transistors, 75, 76, respectively. When a scanning cycle occurs, and $g_2(t)$, the second stage or $F_1/2$ output of divider 65, is negative a low impedance path is provided through transistor 75 between terminal 71 and capacitor 72, to charge the latter with a current proportional to $f(t)$. The total charge accumulated on capacitor 72 during T is a function of the value of $f(t)$ when $g_2(t)$ is negative, transistor switch 75 being cut off when $g_2(t)$ is positive. Thereby, the total voltage across capacitor 72 at the end of the scanning cycle is proportional to $$\int_0^T f(t)g_2(t)dt$$

where $g_2(t)$ is a binary function equal to the $F_1/2$ square wave output of divider 65.

Capacitor 73 and transistor 76 are provided to derive an output signal proportional to $$\int_0^T f(t)\overline{g_2(t)}dt$$

where $\overline{g_2(t)}$ is a binary function equal to the complement of $g_2(t)$. This result is obtained by coupling the $F_1/2$ output of divider 65 through inverter 78 to the base of transistor 76. In consequence, the circuit comprising transistor 76 and capacitor 73 functions in exactly the same manner as the circuit including transistor 72 and capacitor, but they are activated at different times. Thereby, transistor 76 conducts when transistor 75 is cut off and vice versa so the total charge accumulated across capacitor 72 at the end of a scanning cycle is proportional to the integral of $f(t)$ when $$g_2(t)=1, \int_0^T f(t)g_2(t)dt$$

while the charge accumulated across capacitor 73 at the end of a scanning cycle is proportional to the integral of $f(t)$ when $$g_2(t)=0, \int_0^T f(t)g_2(t)dt$$

To determine whether the accumulated values of $f(t)$ when $g(t)$ was a binary zero exceeded the accumulated value of $f(t)$ when $g(t)$ was a binary one, the voltages across capacitors 72 and 73 are sampled immediately after the scanning interval has been completed. To accomplish this, a series discharge path is established for capacitors 72 and 73 through low valued, current sampling resistors 81 and 82, as well as through back-to-back PNP transistors 83 and 84. The bases of transistors 83 and 84 are connected in parallel to lead 66 via current limiting resistor 86. When a negative sampling voltage is applied to the bases of transistors 83 and 84, current flows through the discharge path in a direction determined by the relative charges accumulated by equal valued capacitors 72 and 73. If the total charge, hence voltage, of capacitor 72 exceeds that of capacitor 73, positive current flows from capacitor 72 through transistor 83, capacitor 73, and resistors 81, 82. In response to this current flow, the ungrounded ends of resistors 81 and 82 are negative and positive, respectively. If, however, greater charge is accumulated by capacitor 73 than by capacitor 72, the current flows in the opposite direction, through transistor 84 rather than transistor 83 and the voltages across resistors 81 and 82 are reversed.

To determine the direction of current flow during the sampling interval, hence the binary value computed by the property filter, the voltages across resistors 81 and 82 are applied to the bases of PNP transistors 86 and 87. Transistors 86 and 87 are connected in a common emitter differential amplifier configuration wherein their emitters are connected to opposite ends of current balancing potentiometer 88, the slider of which is connected via a constant current source comprising PNP transistor 89 and current control resistor 90 to a positive D.C. bias at terminal 91. The collectors of transistors 86 and 87 are connected through load resistors 92 and 93 to the negative bias at terminal 94. With equal biases applied to the bases of transistors 86 and 87, their collector currents are adjusted to be equal as a result of adjusting the slider of potentiometer 88. As the relative biases applied to the bases of transistors 86 and 87 vary, the currents flowing through the transistors change, but the total current supplied to slider 88 remains constant. Thereby, the collector currents of transistors 86, 87 are indicative of the relative charges across capacitors 72 and 73 at the end of each scanning cycle.

To provide an indication of the relative current flowing in the collectors of transistors 86 and 87, the voltages across load resistors are respectively applied to the bases of PNP transistors 94 and 95. Transistors 94 and 95 are connected in a common emitter, differential amplifier configuration with their emitters connected to a positive D.C. bias at terminal 96 via load resistor 97. The collectors of transistors 94 and 95 are connected through load resistors 98 and 99, respectively, to the negative bias at terminal 94. The voltage across resistors 98 and 99 are utilized to provide an indication at output terminals 100 and 101 of the relative charges across capacitors 72 and 73 when a scanning cycle has been completed, the voltages at these terminals being the binary complements of each other.

When the current flow between capacitors 72 and 73 is such that the voltage applied to the bases of transistors 86 and 87 are negative and positive, respectively, transistor 86 is rendered highly conductive and transistor 87 is driven towards cut off. In response to this condition, the collector voltages of transistors 86 and 87 go positively and negatively, respectively, causing transistor 94 to be cut off and transistor 95 to be saturated. Saturation of transistor 95 causes its collector to be driven positively, to approximately zero voltage. When the current flow between capacitors 72 and 73 is reversed, transistor 87 conducts heavily while transistor 86 is driven towards cut off, resulting in saturation of transistor 94 and cut off of transistor 95. In consequence, the voltage at terminal 101 assumes the negative voltage at terminal 94 and terminal 100 is at approximately ground voltage.

After the charge stored by capacitors 72 and 73 has been sampled, it is necessary to restore equal charges thereto so erroneous results will not be produced during the next computation cycle. To accomplish this result, PNP transistor 102 is provided. The emitter of transistor 102 is connected to capacitors 72 and 73 via blocking diodes 104 and 105, the cathodes of which are connected to the transistor emitter. Between ground and the emitter of transistor 102 is connected resistor 103, which biases diodes 104 and 105 to the off state so charge from capacitors 72 and 73 will not leak off through it during the capacitor charging cycle. The collector of transistor 102 is connected to negatively biased terminal 103 and the base thereof is coupled to the negative pulse deriving from circuit 61 on lead 67 via current limiting resistor 106.

In operation, transistor 102 is normally cut off by the positive voltage applied to its base from lead 67, so no discharge path for capacitors 72 and 73 exists through it. Just prior to initiation of a scanning cycle, however, transistor 102 is momentarily forward biased into heavy conduction by the derivation on lead 67 of a large negative pulse that is applied to its base. This results in equal negative current flow from terminal 103 and transistor 102 through diodes 104 and 105 to capacitors 72 and 73, whereby the capacitors are charged to the same voltage. The pulse on lead 67 terminates just as the scanning cycle starts so capacitors 72 and 73 are charged to the same voltage and no initial, offsetting bias is introduced.

Recapitulating, a zero voltage pulse is derived from terminal 100 and a negative voltage is derived from terminal 101 if the charge on capacitor 72 is greater than that on capacitor 73 for the scanning interval of interest while the opposite voltages are derived from these terminals if the charge on capacitor 73 is greater than that on capacitor 72. By definition, the signal at terminal 101 is the binary output "B" of property filter 22 and threshold gate 32 (FIG. 1) and the signal at terminal 100 is its complement, $\overline{B}$. Similar binary signals are derived from the remaining gates, as indicated by the letters A, C etc. on FIG. 1. It is to be noted that the signals deriving from the other gates are cross correlations of $f(t)$ with the other $g(t)$'s generated by divider 65.

Figures 3, 4:
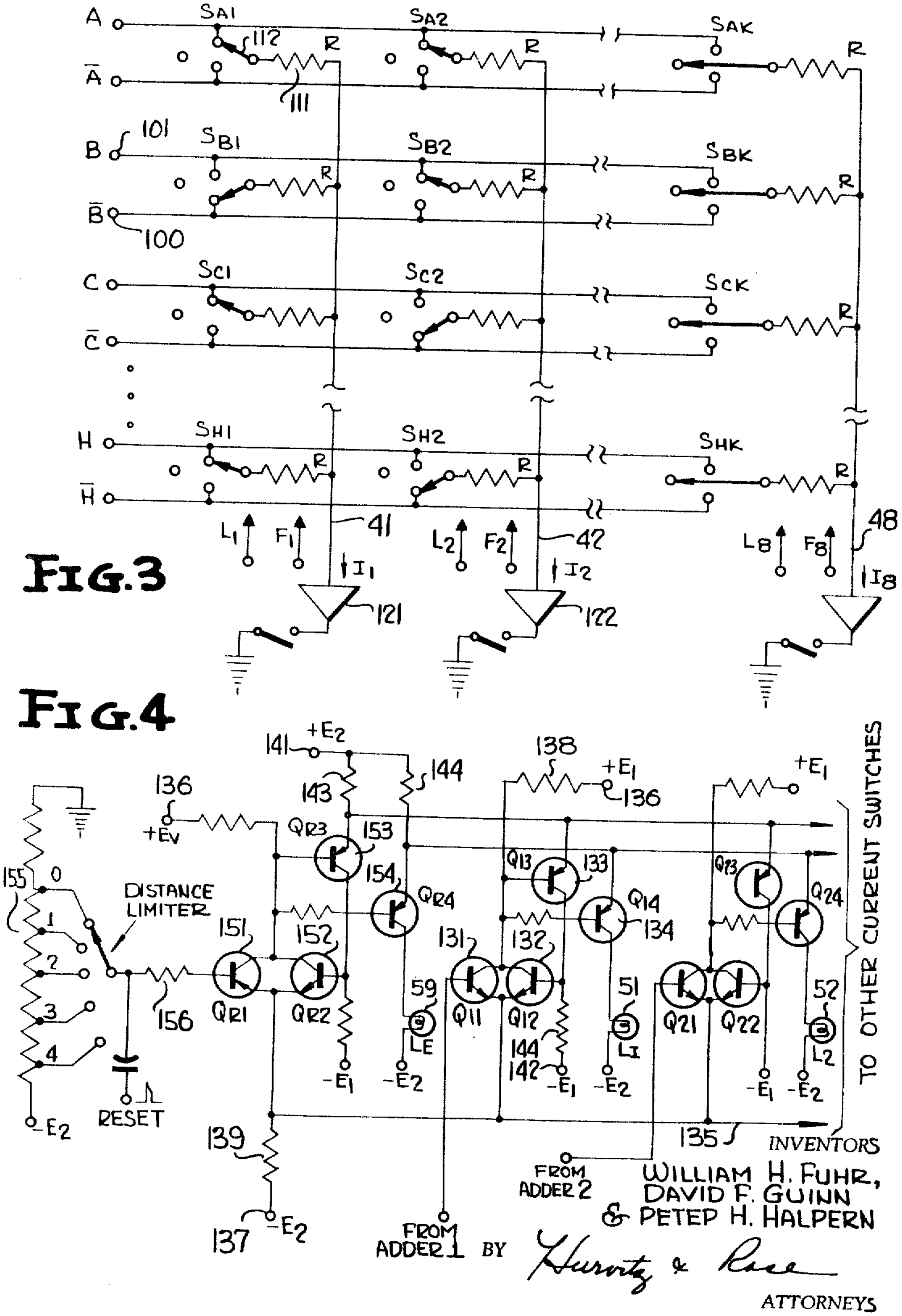
FIGURE 3 is a partial circuit diagram of an embodiment of the "learning" network of FIGURE 1.
FIGURE 4 is a circuit diagram of the least distance circuit of FIGURE 1.

Reference is now made to FIG. 3 of the drawing, a partial schematic diagram of a simplified embodiment of learning network 40. Network 40 includes a matrix of 64 equal valued resistors 111, only some of which are shown for simplicity. The matrix is arranged to have eight rows, one for each property filter, and eight columns, one for each of the designated indicators. To simplify the drawing, the number of columns and rows has been reduced to three and four, respectively. Of course, if the number of filters and/or the number of desired indications change, there are corresponding variations in the columns and rows.

The resistors 111 in each row are selectively connected via double-throw center-off switches 112 to the outputs of one of gates 31–38. Resistors 111 can be connected to the binary indicating signals deriving from terminals 100 of the several gates or to the complementary signals at terminals 101 in response to activation of switches 112. All resistors 111 in each separate column are connected to a current summing amplifier, whereby the resistors in the first column are connected to amplifier 121, the resistors in the second column to amplifier 122, etc.

Initially, with the system in an untrained state, each of switches 112 engages an open contact. When the system is being trained to recognize the letter "A," it is assumed that the binary signals deriving from gates 31–38 are represented by 10100101. The human operator measures these voltages and sets the switches in the first column in a manner indicative of the voltages. Thus, switch $S_{A1}$, the switch of the first column, first row, is set to be responsive to the A output at terminal 101 of gate 31 and switch $S_{B1}$ is set to be responsive to the $\overline{B}$ output at terminal 100 of gate 32. In a similar manner, the remaining switches of the first column are set.

The letter "B" is then "learned" by the system. This letter is scanned with the derivation of the binary word 11011100 from gates 31–38. The voltages generated by gates 31–38 are then measured by the operator to provide indications of the binary word representing the letter B. These binary bits are set into the second column of the matrix in a manner similar to that by which the bits for the letter A were set in the first column. Thereby, switches $S_{A2}$, $S_{B2}$, $S_{C2}$ . . . $S_{H2}$ are coupled to the A, B, $\overline{C}$ . . . $\overline{H}$ outputs of gates 31, 32, 33 . . . 38, respectively.

The remaining six letters to be recognized are then scanned and the operator sets switches 112 to the appropriate contact for the last six columns of the matrix. It is thus seen that the switch positions store an indication of the binary descriptor for each letter to be learned. If it is desired for the machine to "forget" the descriptors "learned" for a particular letter, the switches for the appropriate contact are energized so they simultaneously engage the open circuited contact. A new letter or a new pattern for the same letter may then be "learned" by that column in network 40.

After network 40 has stored the descriptors for each letter, it is able to derive signals indicative of the similarity between the letter being scanned and the letter initially "learned." To describe the manner by which this is accomplished, consider the situation when the same letter "A" is scanned in the identical manner as the letter "A" which resulted in the switches 112 of column one being set. In response to such a letter being scanned, the binary word deriving from gates 31–38 is 10100101 so that a voltage of E is applied to each switch in the first matrix column. Each of these voltages cause a current of $E/R$ ($R$=the value of each resistor in the matrix) to be derived from the respective resistances in the first column, so that the voltage generated by current summing amplifier 121 is proportional to $8E/R$. The voltage deriving from amplifier 122, responsive to the currents on lead 42 of column two, is proportional only to $3E/R$ since only switches $S_{A2}$, $S_{F2}$ and $S_{G2}$ have voltages of amplitude E applied thereto from gates 32, 36 and 37, respectively, and switches $S_{B2}$, $S_{C2}$, $S_{D2}$, $S_{E2}$ and $S_{H2}$ have zero voltages applied to them by gates 31, 33, 34, 35, 36 and 39, respectively. Since the switches in the other columns are positioned differently from those of the first, the current in lead 121 is greater than that in the other vertical leads.

To determine the vertical lead of FIGURE 3 carrying the greatest current, the least distance circuit 39 of FIGURE 4 is provided. Circuit 39 includes nine separate, but identical, networks, one responsive to the signal on each vertical lead of FIGURE 3 and one to preset an initial condition regarding the maximum tolerable Hamming distance between the "learned" and analyzed functions.

The network responsive to the signal deriving from amplifier 121 is taken as exemplary for the other seven networks responsive to the outputs of matrix 40. This network includes a comparison circuit comprising NPN transistor 131 and a latch including NPN transistor 132 and PNP transistor 133. Transistor 131 compares the voltage applied to its base by the output of amplifier 121 with the voltage at its emitter, on lead 135. If the former is more positive than the latter, collector current flows from the positive bias at terminal 136 to the negative bias at terminal 137 via resistors 138 and 139 and the collector emitter path of transistor 131. In response to the drop in voltage at the collector of transistor 131, the emitter base junction of transistor 133 is forward biased and current flows between positively and negatively biased terminals 141 and 142 by way of resistors 143 and 144, as well as the emitter collector path of transistor 133. This results in the application of a positive voltage at the base of transistor 132 to forward bias that transistor into conduction. Thus, transistor 132, hence transistor 133, is latched into conduction once transistor 131 is forward biased, even after the positive voltage at the base of the latter subsides.

To provide an indication that either of transistors 131 or 132 is conducting, their collector voltages are supplied to the base of PNP transistor 134 which has lamp 51 connected in its collector circuit. Base collector energization for transistor 134 is via the path comprising resistors 144 and 139 between terminals 137 and 141. Lamp 134 remains energized in the interval between the derivation of the sampling and reset pulses by timing circuit 61 of FIGURE 2. When the reset pulse is generated, the voltage on lead 135 suddenly increases, in a manner described infra, so the base emitter junction of transistor 132 is back biased. In consequence, transistor 132 cuts off, a positive voltage is applied to the base of transistor 133 causing conduction through that transistor to cease and the application of the negative voltage at terminal 142 to the base of transistor 132. Thus, the latch is broken, transistor 134 ceases conduction and lamp 51 is extinguished.

To control the application of reset pulses to lead 135 and the voltage magnitude maintained thereon that must be overcome by the signals deriving from the vertical leads of the learning matrix, the circuit comprising transistors 151–154 and lamp 59 is provided. This circuit is identical to that described with regard to transistors 131–134 except that the input to the base of comparison transistor 151 is derived from voltage divider 155. Voltage divider 155 includes five taps, denominated 0–4, on a resistance connected between negative terminal 137 and ground. Divider 155 sets the maximum Hamming distance between the learned and analyzed functions before an excess distance indication is presented by lamp 59. The swinger of divider 155 is connected via current limiting resistance 156 to the base of transistor 151, as is the reset output of circuit 61, FIGURE 2. When a positive pulse is applied to the base of transistor 151 by the reset output of circuit 61, the transistor conducts heavily and the voltage on lead 135 goes more positive than the voltage at the base of transistor 132 in any of the eight indicator circuits. As described supra, this causes de-energization of all the indicator circuits.

When the reset pulse terminates, transistor 151 applies a fixed bias to lead 135, the value of which is a function of the position of the swinger arm for divider 155. If the swinger engages the zero contact of divider 155, transistor 151 is considerably forward biased and a fixed positive voltage of considerable amplitude is applied to lead 135. This voltage is so large that only voltages commensurate with $8E/R$ as applied to the bases of transistors 131 are sufficient to overcome it. Thus, only if there is exact agreement in the stored indication for letter A and the signal generated in response to scanning a particular letter A, will the voltage applied from adder 121 to the base of transistor 131 be sufficient to overcome the emitter bias to cause energization of lamp 51. If, however, none of the currents deriving from the vertical leads of the matrix sum to $8E/R$, lamp 59 is energized because the base voltage of its comparison transistor 151 is greater than the base voltage at any of the other comparison transistors.

As the swinger of divider 155 is positioned on the other contacts, the positive level on lead 135 is reduced. With the swinger engaging contact four, it is possible to recognize a letter even though the Hamming distance between the learned and scanned images equals four. With the system tolerating such a wide degree of error, it is very likely that the Hamming distance between the scanned image and more than one stored indication is less than the minimum acceptable error. The present system is capable of determining which of these indications is most accurate as can be seen by considering the following example. Assume that the signals deriving from adders 121 and 122 are proportional to $7E/R$ and $6E/R$, respectively, so that the most correct indication is generated by the former. The $7E/R$ voltage pulse applied to transistor 131 for the circuit associated with lamp 51, causes the voltage on lead 135 to increase above its normal value by a predetermined amount, almost equal to $7E/R$ and more than $6E/R$. In consequence, the emitter for comparison transistor 131 in the circuit associated with lamp 52 is positive relative to its emitter and that transistor remains cut off. Thus, only lamp 51 is energized to indicate that the letter being scanned was an A.

In the previous discussion, it was assumed that only one print font was used to teach the machine. All other fonts were presumed sufficiently like the learned font to enable a meaningful comparison of the learned and analyzed signals deriving from gates 31–38. For many applications this assumption is true. But for other applications, the print fonts may be so dissimilar that the comparison produces no useful information.

The situation for three different print fonts, having similar characteristics, will now be considered. The system for such fonts is exactly like that previously described, except that each of switches 111, FIGURE 3, is a double throw switch, wherein the armatures are independently activated. Thus, both armatures of switch $S_{A1}$ can be simultaneously connected to the A and $\overline{A}$ outputs of gate 31 or one armature can be connected to the A output while the other armature is responsive to the $\overline{A}$ output.

To illustrate the manner by which the present system functions to analyze three different print fonts, assume that the A's and B's for the three fonts are $a_1$, $a_2$, $a_3$ and $b_1$, $b_2$, $b_3$. The binary bits derived by gates 31–38 during the training period are assumed to be given by the following table.

| Character | Gate 1 | 2 | 3 | 4 | 5 | 6 | 7 | 8 |
|---|---|---|---|---|---|---|---|---|
| $a_1$ | 1 | 1 | 1 | 1 | 1 | 1 | 1 | 1 |
| $a_2$ | 1 | 1 | 1 | 1 | 1 | 1 | 1 | 0 |
| $a_3$ | 1 | 1 | 1 | 1 | 1 | 1 | 0 | 1 |
| $b_1$ | 0 | 0 | 0 | 0 | 0 | 0 | 0 | 0 |
| $b_2$ | 1 | 0 | 0 | 0 | 0 | 0 | 0 | 0 |
| $b_3$ | 0 | 1 | 0 | 0 | 0 | 0 | 0 | 0 |

In response to the signals derived when the letters $a_1$, $a_2$, $a_3$ are being learned, switches $S_{A1}$–$S_{A6}$ are all set to be responsive to only the A, B, C . . . F outputs of gates 31–36. When $a_1$ and $a_2$ are being learned, switch $S_{A7}$ is set so the resistor connected to it is responsive to the G output of gate 37. In response to $a_3$, the other contact of switch $S_{A7}$ is set so the resistor connected to it is coupled to the $\overline{G}$ output of gate 37. Similarly, the resistor connected to switch $S_{A8}$ is responsive to both the H and $\overline{H}$ outputs deriving from gate 38 since $a_{18}=a_{38}=1$ and $a_{28}=0$. ($a_{18}$ is the output of gate 28 for print font $a_1$, $a_{38}$ is the output of gate 28 for print font $a_1$, etc.) In the second column, switches $S_{B3}$–$S_{B8}$ are all set so that the resistor connected to each of them is responsive only to the complementary outputs of gates 33–38. The armatures for switches $S_{B1}$ and $S_{B2}$ are connected to the A, $\overline{A}$ and B, $\overline{B}$ outputs of gates 31 and 32, respectively since $b_{11}=b_{13}=0$, $b_{12}=1$ and $b_{21}=b_{22}=0$, $b_{23}=1$. Thereby, during an analyzing scan the resistors connected to switches $S_{B1}$ and $S_{B2}$ always have a voltage of E applied thereto.

During an analyzing cycle, after network 40 has stored descriptors for the eight letters "learned," analyzation cycles are initiated to provide indications of the letters being read. These analyzation cycles are exactly the same as the one considered supra when only one print font was learned by the machine. Thus if any of $a_1$, $a_2$ or $a_3$ is analyzed after the system has been "taught" the binary descriptors thereof, lamp 51 is energized while lamp 52 is actuated when any of $b_1$, $b_2$ or $b_3$ is analyzed. If the binary signals deriving from gates 31–38 does not correspond with any of the learned descriptors, an indication will be derived of the learned descriptor closest, in the Hamming sense, to the output of gates, provided the Hamming distance does not exceed the value inserted on divider 155, FIGURE 5.

The information derived is not as accurate, however, because three different binary words deriving from gates will provide the maximum $8E/R$ output from summing amplifiers 121 and 122. The possible inaccuracy can be seen by considering the case where the letter $C_1$ normally causes the deviation of 00111110 from gates 31–38. If the equipment is not functioning in an accurate manner, gates 31–38 may easily generate the word 01111110. Of course, this would cause the derivation of an erroneous indication that the letter being read is A, not C. The possibility of this occurring is much greater when three fonts, rather than one, are taught to learning network 40 because the number of possible switch combinations for the separate letters is considerably reduced.

To determine the number, $n$, of filter channels necessary in making an analyzation that has a probability, $P_2$, of being accurate when $k$ signal classes, each having $r$ members, is considered the relationship $$P_2=1-[2^{-(n+1)}r^2k(k-1)] \quad . . . \qquad (2)$$

can be shown to exist if there is a 0.5 probability that the signal deriving from each gate equals a binary one and the outputs of the separate gates are independent. This is the case with the property filter and threshold circuit shown in FIGURE 2.

The significance of Equation 2 can be realized if it is assumed that eight letters are learned by the system, that there are three different print fonts for each letter and that the desired probability of accuracy is 0.8. Thus $k=8$, $r=3$ and $P_2=0.8$. The number of parallel filter sections, such as filters 21–28, can be determined by substituting the above values of $k$, $r$ and $P_2$ into Equation 2 and solving for $n$. This yields the result $n=7$. In other words, if a system accuracy of 80% is tolerable, eight different letters, each of which has three print fonts associated therewith, can be recognized with the present system if only seven property filters and threshold gates are employed.

While the present invention has been described in connection with a system for recognizing print fonts, its use is not limited to that field. The system can be utilized to recognize, within limits, any type of signals that do not invariably repeat themselves when the same information is being derived.

The utilization of a resistance-switch matrix, as illustrated in FIGURE 3, is not necessary. The step of an operator measuring the learned binary signals can be obviated if a magnetic core matrix is substituted for the switch matrix. This is possible since the cores can store the learned signals and thereafter derive binary bits indicative of the relationship between each stored bit and the output of each gate 31–38.

Figure 5:
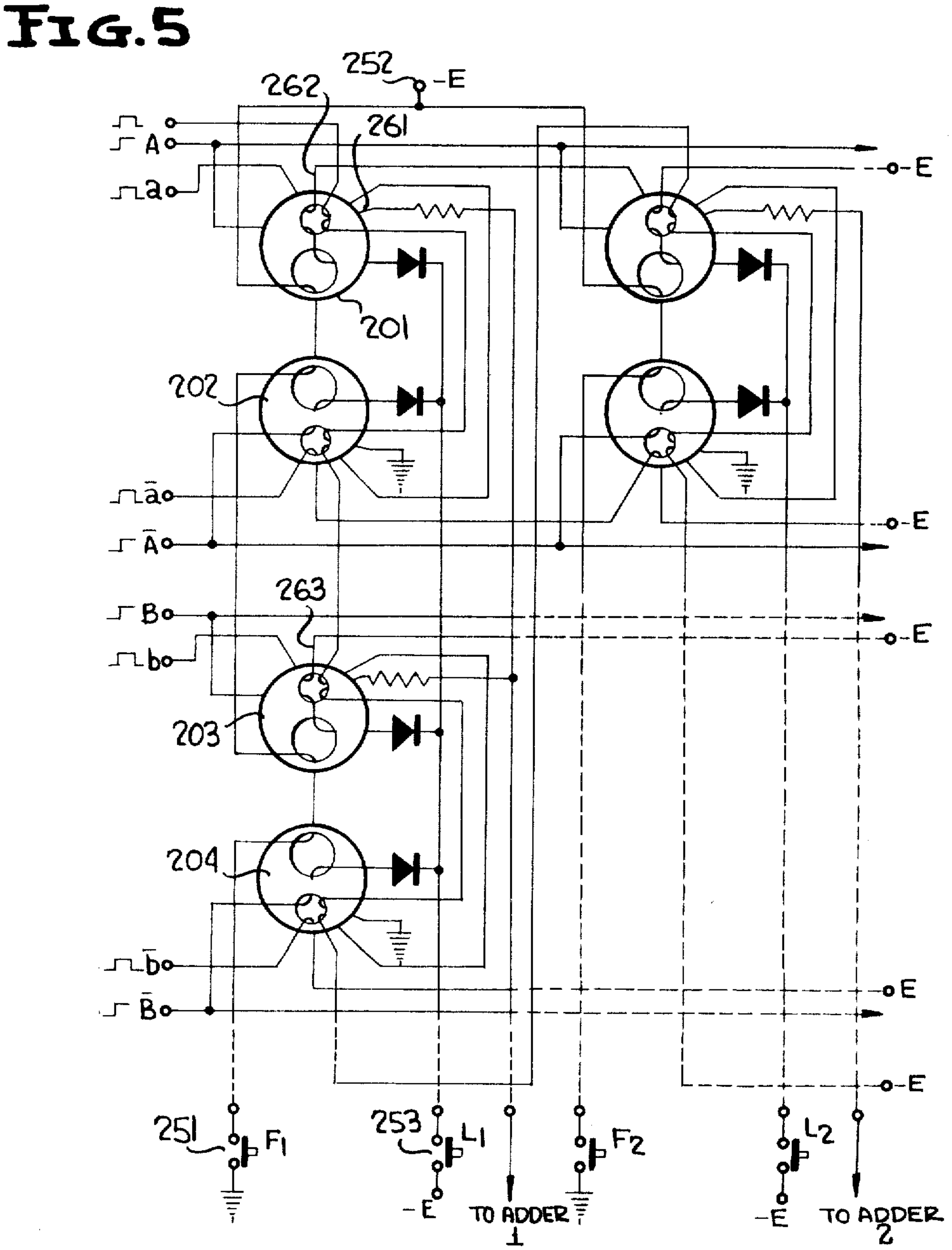
FIGURE 5 is a partial circuit diagram of a modified learning network employing magnetic cores.

A preferred embodiment of a segment of the core matrix that can be substituted for the switch matrix of FIGURE 3 is illustrated by FIGURE 5. In the embodiment of FIGURE 5, two multi-aperture, rectangular hysteresis loop, magnetic cores tor transfluxors are substituted for each switch and resistance of FIGURE 3. One core is responsive to the direct output of its respective gate while the other is responsive to the complementary gate output. Thus, core 201 is responsive to the A output of gate 31 and core 202 is activated only by the $\bar{A}$ output of the same gate. The cores and switches are arranged topographically in an identical manner.

One difference, however, is that in the matrix positive pulses are applied by gates 31, 32 . . . 38 to terminals A, $\bar{A}$, B, $\bar{B}$ . . . H, $\bar{H}$ during the learning sequence and that these same gates apply positive pulses to terminals $a$, $\bar{a}$, $b$, $\bar{b}$ . . . $h$, $\bar{h}$ when the system is analyzing. Selective coupling of signals from gates 31–38 to the matrix input is provided by conventional switching, not shown.

Current is selectively applied to the major aperture of each core in the first column via the path between the grounded contact of "forget" switch 251 and negatively biased terminal 252. When switch 251 is closed, a counterclockwise flux is induced in the upper two legs of each core of the first column. Since the field that produced this flux is sufficient to overcome the effects of any other fields applied to the cores, closing switch 251 is equivalent to the "forget" position for the switches of FIGURE 3. In a similar manner, the cores of the other columns can be blocked by closing the appropriate "forget" switches.

When it is desired for the cores in column one to "learn" or store biary indications of a particular letter, switch 251 is opened and switch 253 is closed. This reduces the field applied to the cores by the "forget" winding but has no effect on the core flux level because of their rectangular hysteresis loop characteristics.

Let it now be assumed that with the system in the learning mode, whereby switches 251 and 252 are respectively open and closed, that positive pulses are applied by gates 31 and 32 to the A and $\bar{B}$ terminals of the core matrix. These pulses induce on the center legs of the cores with which they are coupled fields of sufficient value to reverse the flux direction on the center leg. Thus in core 201, the flux direction in the upper leg remains counterclockwise but in the lower leg it is switched clockwise. In core 204, the flux around the minor aperture remains counterclockwise while the flux direction around the major aperture is switched to a clockwise direction in response to the positive pulse at terminal $\bar{B}$. Cores 202 and 203 remain in the same state they previously occupied, i.e., counterclockwise fluxes about both apertures, since the resulting negative voltages at terminals $\bar{A}$ and B are blocked by the diodes connected to the leads extending through the core center legs.

If $n$ print fonts for the letter stored in the first column are to be "learned," the learning signals deriving from gates 31–38 are applied to the appropriate cores $n$ times. Thus, if the second font being learned causes a positive pulse to be derived at the $\bar{A}$ output of gate 31 and the first font resulted in an A output of the same gate, the major apertures of both cores 201 and 202 are driven in the counterclockwise flux direction. This is equivalent to connecting resistor $R_{A1}$, FIGURE 3, to leads A and $\bar{A}$.

After the cores of the first column have stored the binary indications for the first letter learned, switch 253 is opened. After "forget" switch 254 has been closed then reopened and "learn" switch 255 closed, signals are supplied to and stored in the second column. These signals are indicative of the second letter to be learned and are coupled to the second column cores as a result of the current paths now existing between the "learning" input terminals, A, $\bar{A}$, B, etc., and the winding on the center leg of each core in the second column. The process is continued down the line, column by column, until binary bits indicative of each letter to be learned are stored in the respective cores.

After the cores have stored the information necessary for "learning," they are ready to provide signals indicative of the degree of match between the stored and analyzed signals. To describe the manner in which the cores function to derive this information, it is assumed that cores 201 and 204 have been set during the "learning" process in response to the presence of positive pulses at the A and $\overline{B}$ terminals and cores 202 and 203 have not been set. Also, assume that gates 31 and 32 derive signals on their A and B outputs for the letter being analyzed, These assumptions should result in the generation of a positive current in the output winding 161 between the upper and middle legs of core 201. The remaining cores should not generate any current. These results, which provide agreement with the manner in which the circuit of FIGURE 3 functions, will now be demonstrated.

Immediately prior to the derivation of the sampling pulse by circuit 61, FIGURE 2, a positive prime pulse is applied via terminal P to the outer leg of the minor aperture of each core. For cores 201 and 204, those that have been set, this causes a flux reversal about the minor aperture so that the flux directions in the upper leg of core 201 and the lower leg of core 204 are from left to right and right to left, respectively. The flux reversal occurs because the field produced in response to the priming pulse opposes the stored field at every point about the minor aperture. In cores 202 and 203, there is no flux reversal because the stored and applied flux directions in the center leg are identical so the flux directions are counterclockwise about both apertures of both cores.

After the prime pulse has terminated, positive pulses are applied to input windings 262 and 263 on the upper legs of cores 201 and 203 via terminals *a* and *b*, respectively. The pulse applied via winding 262 to the minor aperture of core 201 opposes at every point the flux induced about that aperture by the priming pulse. In consequence, the flux direction about the aperture is reversed and a current is derived from output winding 261. Currents from the various cores of the first column are summed by adder 121. The resultant sum is supplied to the least distance indicator of FIGURE 4 via a gate, not shown, that is opened synchronously with, but slightly delayed from the derivation of sampling pulses by circuit 61.

In core 203, the field induced in the upper leg by the pulse at terminal *b* is in the same direction as the stored field, there is no flux reversal about the minor aperture and no current induced in the core output winding. Zero output current is generated by cores 202 and 204 since no pulses are applied to their input windings, as is necessary to cause flux reversals.

The cores remain in the flux states indicated supra from the time an output current is generated until the derivation of the next prime pulse. The prime pulse sets all of the cores back to the same state they occupied immediately prior to the derivation of the preceding sample pulse. Thereby, the cores are conditioned, once again, to derive the necessary information concerning degree of match between stored and analyzed signals.

While we have described and illustrated one specific embodiment of our invention, it will be clear that variations of the details of construction which are specifically illustrated and described may be resorted to without departing from the true spirit and scope of the invention as defined in the appended claims.

We claim:

1. A system for classifying signals in accordance with a common arbitrarily selected property, comprising memory means for storing a plurality of binary words; means responsive to incoming signal for selectively extracting therefrom information regarding said property from which to generate a binary word descriptive of said incoming signal during a predetermined time interval, said selective extracting means including means for rendering the generation and valve of each bit of said descriptive binary word independent of that of each of the other bits thereof; means for selectively introducing into said memory means binary words derived by said selective extracting means descriptive of known signals; and means for comparing the binary word derived from an unknown signal with each of the stored binary words to determine which known signal, if any, the unknown signal most closely resembles.

2. The system according to claim 1 wherein said means for selectively introducing is further operable to alter the binary word contents of said memory means as desired to vary the classes or properties of stored signals.

3. A system for classifying unknown signals according to a set of preselected known signals, said system including means for selectively deriving from at least one randomly selected property of an incoming signal a binary word composed of a plurality of bits and representative of said incoming signal, said deriving means including a plurality of property filters at least equal in number to the number of bits positions in said binary word, each property filter deriving a respective bit in response to said incoming signal independently of the response of each of the other property filters and with equal probability that the derived bit has one or the other binary value; means for storing selected ones of the derived binary words representative of known signals; and means for comparing each bit in a derived binary word representative of an unknown signal with the bit in a corresponding position of each stored binary word to determine the degree of match therebetween.

4. The system according to claim 3 wherein is further included means responsive to said comparison for detecting the least logical distance between the binary word representative of said unknown signal and the respective stored binary words representative of the known signals, as a measure of said degree of match.

5. The system according to claim 3 wherein each of said property filters includes a pair of means for integrating incoming signal, means for alternating energizing said integrating means for equal portions of a preselected time interval of the incoming signal, and means for comparing the results of the integration operation preformed by said pair of integrating means at the conclusion of said time intervals, from which to develop the value of the bit derived by the respective property filter.

6. A waveform recognition system, comprising means for storing a plurality of binary words each representative of a waveform to be recognized; a group of property filters, each deriving a bit in response to parallel application of an unknown waveform to the group, each bit thereby occupying a position in a binary word representative of said unknown waveform; means for controlling the response of each property filter to an incoming waveform over a preselected time interval to render the derivation of a bit thereby independent of the derivation of a bit by each of the other filters; means for comparing the set of bits derived by said group of property filters at the conclusion of each said time interval with the bits in respectively corresponding positions of each stored binary word, to provide an indication of the logical distance between said derived set of bits and each stored binary word with which it is compared; and means for detecting the least logical distance as a measure of the closest match between said set of bits and the stored binary words.

7. The system according to claim 6 wherein is further provided means for selectively altering one or more bits of each stored binary word to permit said system to recognize new waveforms of which the altered words are reperesentative.

8. A waveform recognition system for classifying bandwidth-limited waveforms over a preselected time interval, said system comprising a plurality of filter means coupled for parallel response to a waveform to be analyzed for detecting the presence and magnitude of a randomly selected property of said waveform, means for controlling the response of each said filter means to render said response independent of the response of each of the other of said filter means, means responsive to the detection of said waveform property by each said filter means for generating a binary digit having a value dependent upon the magnitude of said property relative to a preselected reference magnitude, whereby to produce a binary word descriptive of said waveform over said preselected time interval, and means containing a plurality of stored binary words descriptive of known waveforms for comparison with the binary word descriptive of said waveform to be analyzed for recognition thereof.

9. The system according to claim 8 wherein said response controlling means comprises means for applying to each said filter means a periodic signal having a frequency equal to an exact multiple of the reciprocal of said preselected time interval and differing from the frequency applied to each of the other of said filter means.

10. A pattern recognition system comprising means for converting a pattern under observation to an electrical signal for analysis; means for extracting from said signal an $n$-bit digital word descriptive of said pattern in terms of an arbitrary property thereof, said digital word extracting means including a plurality of property filters each coupled for concurrent response to said signal, each filter for generating an output having substantially equal probability of exceeding or falling below a predetermined threshold value, independent of the response of each of the other filters; means for storing digital words descriptive of known patterns; and means for comparing bits in corresponding positions of a digital word representative of an unknown pattern and the stored digital words descriptive of known patterns, to detect the closest match between unknown pattern and a known pattern in terms of least logical distance between their respective descriptive digital words.

11. The system according to claim 10 wherein is provided means for generating a signal indicative of a lack of agreement between said respective descriptive digital words within a preselected maximum acceptable logical distance.

12. The system according to claim 10 wherein said digital word extracting means further includes means for enabling each of said property filters to respond to said signal over a preselected interval of time, said enabling means including means for applying to each property filter a waveform having a frequency equal to an exact multiple of the frequency defined by the reciprocal of said preselected time interval and differing from the frequency of the respective waveform applied to each of the other property filters, to produce the independence of response of each property filter.

13. The system according to claim 12 wherein each property filter comprises means responsive to said signal and to the respective said waveform applied thereto for developing a voltage proportional to the integral of the product of said signal and the respective said waveform over said preselected time interval, and means for removing said developed voltage prior to the start of the time interval for analyzing the next signal.

14. The system according to claim 13 wherein said digital word extracting means further includes means for comparing said developed voltage to a voltage having said predetermined threshold value to generate a bit having a binary value dependent upon the relative magnitudes of said developed voltage and said threshold value.

15. The system according to claim 10 further including means for selectively altering the values of bits in each stored word to correspondingly vary the patterns which the system is capable of recognizing.

References Cited by the Examiner

UNITED STATES PATENTS

| | | | |
|---|---|---|---|
| 2,947,971 | 8/1960 | Glauberman et al. | 340—172.5 |
| 3,172,954 | 3/1965 | Belar et al. | 340—172.5 |

ROBERT C. BAILEY, *Primary Examiner.*

G. D. SHAW, *Assistant Examiner.*